US 9,569,610 B2

(12) United States Patent
Arning et al.

(10) Patent No.: US 9,569,610 B2
(45) Date of Patent: Feb. 14, 2017

(54) MANAGING A PASSWORD

(71) Applicant: International Business Machines Corporation, Armonk, NY (US)

(72) Inventors: Andreas Arning, Tuebingen (DE); Jens Engelke, Holzgerlingen (DE)

(73) Assignee: International Business Machines Corporation, Armonk, NY (US)

(*) Notice: Subject to any disclaimer, the term of this patent is extended or adjusted under 35 U.S.C. 154(b) by 8 days.

(21) Appl. No.: 14/228,889

(22) Filed: Mar. 28, 2014

(65) Prior Publication Data

US 2015/0278509 A1 Oct. 1, 2015

(51) Int. Cl.
| G06F 7/04 | (2006.01) |
| G06F 15/16 | (2006.01) |
| G06F 17/30 | (2006.01) |
| H04L 29/06 | (2006.01) |
| G06F 21/45 | (2013.01) |

(52) U.S. Cl.
CPC ..................... G06F 21/45 (2013.01)

(58) Field of Classification Search
CPC .......... G06F 21/45; G06F 21/46; G06F 21/31; H04L 9/3226
USPC ....................................... 726/6, 18
See application file for complete search history.

(56) References Cited

U.S. PATENT DOCUMENTS

| 6,484,259 | B1 * | 11/2002 | Barlow ......................... 713/159 |
| 8,528,064 | B2 | 9/2013 | Nichols et al. |
| 2007/0125847 | A1 * | 6/2007 | Millett et al. ................. 235/382 |
| 2008/0046369 | A1 * | 2/2008 | Wood ............................. 705/50 |
| 2008/0313721 | A1 * | 12/2008 | Corella ........................... 726/6 |
| 2009/0019540 | A1 | 1/2009 | Itsik |
| 2011/0296509 | A1 | 12/2011 | Todorov |
| 2012/0311700 | A1 | 12/2012 | Tamura |
| 2013/0254856 | A1 | 9/2013 | Krishan |

FOREIGN PATENT DOCUMENTS

| WO | WO 0244861 A2 * | 6/2002 |
| WO | WO 2015076835 A1 * | 5/2015 |

OTHER PUBLICATIONS

Arning, A., et al., "Managing a Password", U.S. Appl. No. 14/563,251, filed Dec. 8, 2014.
Anonymous, "Method and System for Cross Site Password Protection", IP.com Prior Art Database Technical Disclosure, Aug. 11, 2010. IP.com No. IPCOM000198676D.
IBM, "Password Management Using Authentication ID (AID)", IP.com Prior Art Database Technical Disclosure, Jun. 1, 2009. IP.com No. IPCOM000183801D.

(Continued)

Primary Examiner — Michael S McNally
Assistant Examiner — Amie C Lin
(74) Attorney, Agent, or Firm — Jay Wahlquist

(57) ABSTRACT

A computer implemented method for managing a password is disclosed. The method can include generating a first hash value corresponding to a first password. The method can also include determining whether the first hash value corresponds with a second hash value included in the set of hash values. Further, the method can include suppressing storage of the first password in the set of passwords in response to determining that the first hash value corresponds with a second hash value included in the set of hash values.

11 Claims, 5 Drawing Sheets

(56) References Cited

OTHER PUBLICATIONS

Unknown, "Secure Hash Algorithm", Wikipedia, last modified Jan. 2, 2014. https://en.wikipedia.org/wiki/Secure_Hash_Algorithm.
Unknown, "SHA-3", Wikipedia, last modified Jan. 3, 2014. https://en.wikipedia.org/wiki/SHA-3.

* cited by examiner

MANAGING A PASSWORD

BACKGROUND

The present disclosure relates to computer systems, and more specifically, to computer systems for managing a password.

Passwords are a widely used method of authentication used by computers and networks. A single user may use many passwords to access different password protected domains, or access password protected content. As the use of passwords for authentication increases, the need for managing passwords may also increase.

SUMMARY

Aspects of the present disclosure, in certain embodiments, are directed toward a computer implemented method for managing a password. In certain embodiments, the method can include generating a first hash value corresponding to the first password. The first hash value can be generated by a secure hash algorithm. The method can include comparing the first hash value to the set of hash values. The method can also include determining whether the first hash value corresponds with a second hash value included in the set of hash values. Further, the method can include suppressing storage of the first password in the set of passwords in response to determining that the first hash value corresponds with a second hash value included in the set of hash values.

Aspects of the present disclosure, in certain embodiments, are directed toward a computer implemented method for managing a password. The method can include determining, in response to receiving a firs password, that the first password is not stored in a set of passwords. The method can further include generating, in response to determining that the first password is not stored, a first hash value corresponding to the first password. In certain embodiments, the method can include comparing the first hash value to a set of hash values. Further, the method can also include storing, the first hash value in the set of hash values in response to determining that the first hash value is not included in the set of hash values.

Aspects of the present disclosure, in certain embodiments, are directed toward a system for managing a password. In certain embodiments, the system can include a determining module configured to determine, in response to receiving a first password, that the first password is not stored in a set of passwords. The system can also include a generating module configured to generate a first hash value corresponding to the first password. In certain embodiments, generating the first hash value corresponding to the first password can be performed in response to determining that the first password is not stored. The system can include a comparing module configured to compare the first hash value to a set of hash values. In certain embodiments, the system can include a storing module configured to store the first hash value in the set of hash values in response to determining that the first hash value is not included in the set of hash values.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
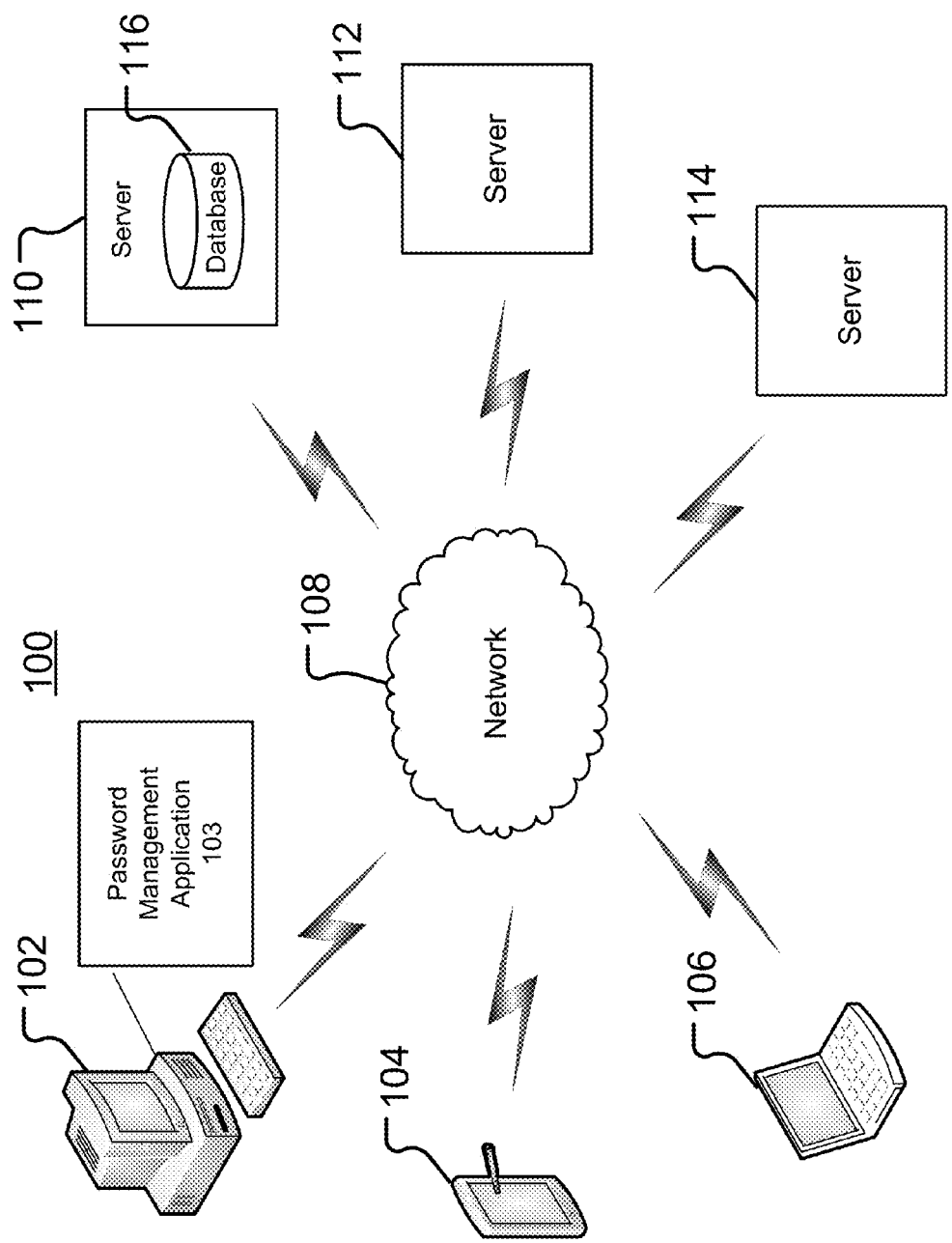
FIG. 1 is a diagrammatic illustration of an exemplary computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and methodology for managing a password. More particular aspects relate to storing a hash value corresponding to a first password. The methodology may include determining, in response to receiving a first password, whether the first password is to be stored in a set of passwords. The methodology may include generating, in response to determining that the first password is not to be stored, a first hash value corresponding to the first password. The methodology may further include comparing the first hash value to a set of hash values. Additionally, the method may include storing the first hash value in the set of hash values. Storing the first hash value in the set of hash values may be performed in response to determining that the first hash value is not stored in the set of hash values.

Passwords are a widely used method of authentication used by computers and networks. A single user can use tens or even hundreds of passwords to access various password-protected domains or password protected content. As a result, password management has become a burden for users, who can suffer inconvenience, data loss, or other setbacks in the event that a password is lost. Various software password managers have been developed to ease this burden. For example, some internet browsers and other programs monitor passwords as they are entered by a user, and offer to "remember" (e.g., save, or store) the password. When a user next visits the same domain, the internet browser or program can enter the password automatically. Comparable systems can be used for computer boot sequences, operating system log-in, and other passwords required for secure computer operation. However, in certain situations, a user may make use of multiple passwords for different purposes within the same domain or program. In other situations, multiple users may work in a shared environment, where each user has a different password. In such situations, remembering a particular password could have negative impacts on security, and be unsafe/undesirable to store, while it may be acceptable to store one or more other passwords. Therefore, storing a password based on the domain or program module may not offer a sufficient solution. Accordingly, aspects of the present disclosure relate to a method and system that facilitates storing of a password based on the password itself. Aspects of the present disclosure are directed toward storing a hash value corresponding to a first password (e.g., a particular password that should not be remembered), and recognizing subsequent entries of the first password so as to avoid undesirable storage of the first password. The present disclosure may provide benefits associated with password management efficiency and password security.

As described herein, aspects of the present disclosure are directed toward recognizing that a first password (e.g., a particular password that should not be stored) has been entered, and suppressing a dialog menu offering storage of the first password. More particular aspects are directed toward generating a first hash value corresponding to the first password, and comparing the first hash value to a set of hash values. Each hash value of the set of hash values may, for example, correspond to a password that should not be stored. Additional aspects are directed toward deciding that the first hash value corresponds to a second hash value stored in the set of hash values, and suppressing storage of the first hash value in the set of hash values. In certain embodiments, additional hash values can be added to the set of hash values. For example, they may be added by a user, or they may be added programmatically. Further aspects of the present disclosure are also directed toward removing a hash value from the set of hash values.

Aspects of the present disclosure include a method and system for managing a password. More particular aspects relate to storing a hash value corresponding to a first password. The method and system may work on a number of devices and operating systems. Aspects of the present disclosure include determining, in response to receiving a first password, whether the first password is to be stored in a set of passwords. The first password may, for example, be entered by a user into a dialog menu. The first password may be an arbitrary-length character string. Determining that the first password is not stored in the set of passwords can include comparing the first password to the set of passwords. The set of passwords may be stored, for example, in the configuration of an internet browser.

Aspects of the present disclosure can include generating, in response to determining that the first password is not to be stored, a first hash value corresponding to the first password. The first hash value may be generated by a secure hash algorithm configured to map a data input to a non-invertible data output. The data input may be an arbitrary-length string of characters, and the data output may be a fixed-length numeric string.

Aspects of the present disclosure include comparing the first hash value to a set of hash values. The set of hash values may be associated with the configuration of an internet browser. For example, the hash values may be stored in an internet browser. Each hash value of the set of hash values may correspond with a password. Aspects of the present disclosure include storing the first hash value in the set of hash values. Storing the first hash value in the set of hash values can be performed in response to determining that the first hash value is not included in the set of hash values.

Additional aspects of the present disclosure are directed toward comparing, in response to storing the first hash value in the set of hash values, a second hash value to the set of hash values. Further, the method can include suppressing, in response to determining that the second hash value corresponds with a hash value included in the set of hash values, a dialog menu for storing the first password in a set of passwords. Additional aspects of the present disclosure are directed toward receiving a password delete request. In response to receiving the password delete request, the method can include generating a first hash value corresponding to the first password. Further, the method can include deleting, from a set of hash values, a second hash value corresponding to the first hash value.

Turning now to the figures, FIG. 1 is a diagrammatic illustration of an example computing environment, consistent with embodiments of the present disclosure. Specifically, the environment 100 can include one or more client devices 102, 104, 106 and one or more host devices 110, 112, 114. Client devices 102, 104, 106 and host devices 110, 112, 114 may be remote from each other and communicate over a network 108 in which the host devices 110, 112, 114 comprise a central hub from which client devices 102, 104, 106 can establish a communication connection. Alternatively, the host devices and client devices may be configured in any other suitable relationship (e.g., in a peer-to-peer or other relationship).

The network 100 can be implemented by any number of any suitable communications media (e.g., wide area network (WAN), local area network (LAN), Internet, Intranet, etc.). Alternatively, client 102, 104, 106 and host devices 110, 112, 114 may be local to each other, and communicate via any appropriate local communication medium (e.g., local area network (LAN), hardwire, wireless link, Intranet, etc.).

Client device 102 can include a password management application 103. The password management application 103 can facilitate determining if a password is stored in a set of passwords, generating a hash value corresponding to a password, comparing the hash value to a set of hash values, and storing a hash value in a set of hash values. The password management application 103 can be configured to access one or more databases or other computer systems to access a password protected domain or password protected content.

Host devices 110, 112, 114 can enable users to submit requests (e.g., login requests or content access requests) to host devices 110, 112, 114 for authentication. For example, the client devices 102,104, 106 may include a login module (e.g., in the form of a web browser or any other suitable software module) and present a graphical user interface (e.g., GUI, etc.) or other interface (e.g., command line prompts, menu screens, etc.) to receive authentication requests/login requests/content access requests from users for submission to one or more host devices 110, 112, 114. The host devices may then grant or deny the authentication requests/login requests/content access requests.

In certain embodiments, one or more host devices 110, 112, 114 may include one or more databases 116. For example, the database 116 may, in certain embodiments, include protected content that requires password authentication to access. In certain embodiments, the database 116 may include stored passwords, user names, or other content accessible by the client devices 102, 104, 106.

Client devices 102, 104, 106 and host devices 110, 112, 114 may be implemented by a suitable computer system. The computer systems may be equipped with a display or monitor, a base, where the base includes at least one processor, memory and/or internal or external network interface or communications devices (e.g., modem, network cards, etc.), optional input devices (e.g., a keyboard, mouse, or other input device), and any commercially available and custom software (e.g., browser software, communications software, server software, natural language processing software, search engine and/or web crawling software, filter modules for filtering content based upon predefined criteria, etc.). The computer systems may include server, desktop, laptop, and hand-held devices. For example, the computer systems may include tablets, cell phones, smart phones, personal digital assistants, or other mobile devices. The computer systems may include one or more modules or units to perform the various functions of present disclosure embodiments described below (e.g., determining that a first password is not stored in a set of passwords, generating a hash value corresponding to the first password, comparing the first hash value to the set of hash values, storing the first hash value, etc.), and may be implemented by any combination of any quantity of software and/or hardware modules or units.

Figure 2:
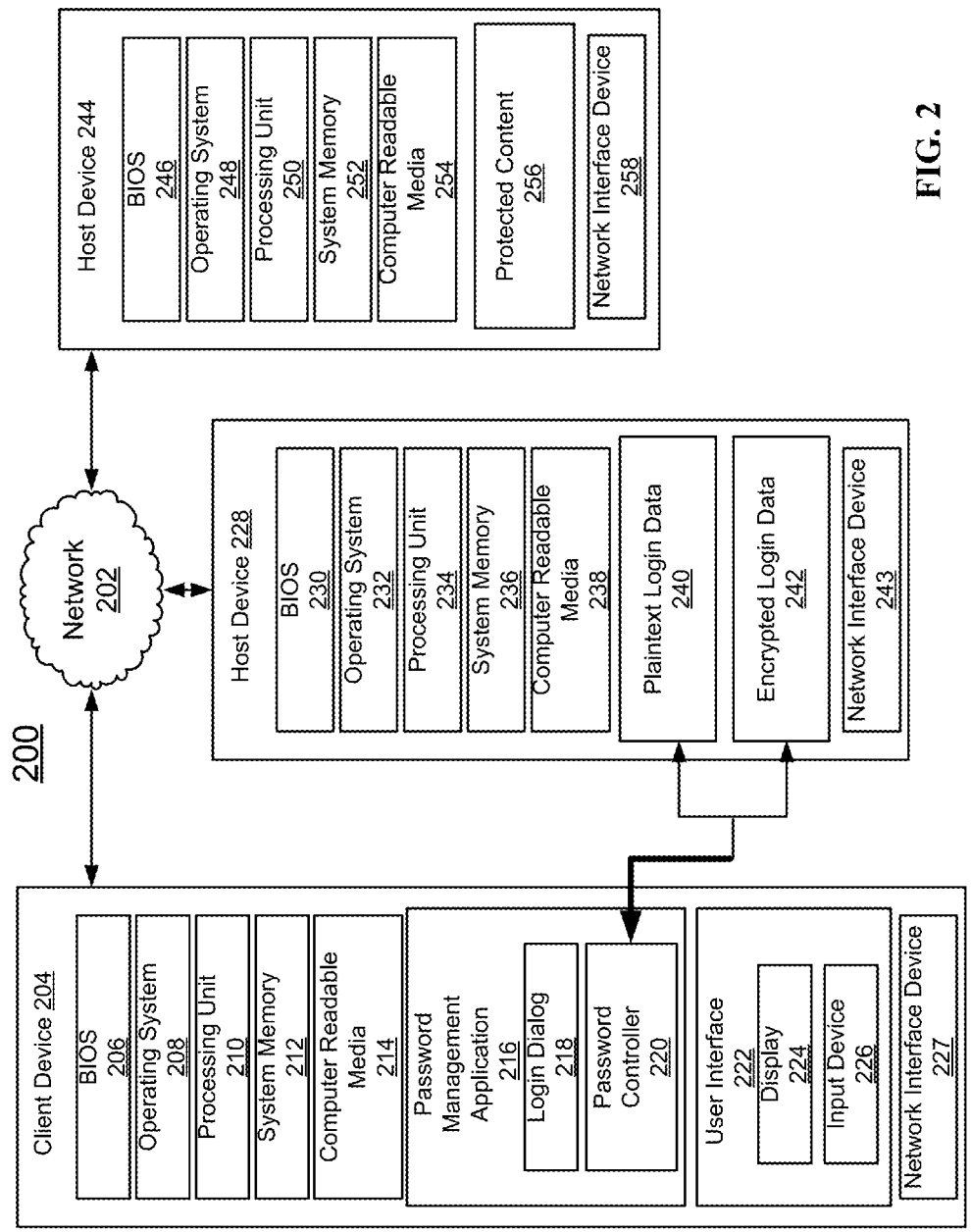
FIG. 2 illustrates an example network architecture for a system for managing a password, according to embodiments.

FIG. 2 illustrates an example network architecture 200 for a system for managing a password, consistent with embodiments of the present disclosure. Aspects of FIG. 2 are directed toward a network architecture 200 that facilitates the implementation of an application for managing a password. Consistent with various embodiments, the network architecture 200 can include one or more host devices 228, 244 and a client device 204 communicatively connected via a network 108. The host device 228 can include plaintext login data 240 and encrypted login data 242. As an example, in certain embodiments, the plaintext login data 240 can include stored passwords and usernames. The encrypted login data 242 can, for example, contain hash values generated by a secure hash function. The host device 244 can include protected content 256. The plaintext login data 240, encrypted login data 242, and protected content 256 can be configured to be accessible by the client device 204 in response to an input request.

As shown in FIG. 2, the client device 204, host device 228, and host device 244 can include a network interface device 227, 243, 258, a BIOS (basic input-output system) 206, 230, 246, an operating system 208, 232, 248, one or more processors or processing units 210, 234, 250, a system memory 212, 236, 252 and some form of computer-readable media 214, 238, 254. The network interface device 227, 243, 258 can facilitate communication between the client device 204, host device 228, host device 244, and the network 202. In certain embodiments, the various components of the client device 204, host device 228, and host device 244 respectively can be coupled together by a system bus.

As shown in FIG. 2, the client device 204, host device 228, and host device 244 can include one or more forms of computer-readable media 214, 238, 254. For example, computer-readable media can include storage media, such as random-access memory (RAM), read-only memory (ROM), electrically erasable programmable read-only memory (EEPROM), flash memory, hard disks, optical disk storage, or other mediums that can be used to store information that can be accessed by the client device 204, host device 228, and host device 244, respectively. Additionally, computer-readable media can include communication media, such as computer-readable instructions, data structures, and program modules. Wired media, such as a wired network or a direct-wired connection, and wireless media, such as acoustic, radio frequency, infrared, and other wireless media are further examples of communication media. Combinations of the above are also included within the scope of computer-readable media.

In certain embodiments, the client device 204, host device 228, and host device 244 can include a BIOS 206, 230, 246 and an operating system 208, 232, 248 accessible by the system memory 212, 236, 252. The BIOS 206, 230, 246 and the operating system 208, 232, 248 can facilitate the transfer of information between elements within the client device 204, host device 228, and host device 244, respectively as well as the implementation of application programs and other program modules. A user interface can also be linked to the client device 204 that allows a user to interact with the application programs and program modules of the client device 204. For example, the user interface can include a display 224 such as a computer monitor, and an input device 226 such as a keyboard, a touch screen, or a pointing device (e.g., a mouse, trackball, pen, or touch pad.)

Consistent with various embodiments, the client device 204 can include a password management application 216. The password management application 216 can be executable by the client device 204, and can be responsive to user input data for initiating a login request to access a password protected domain or password protected content, such as protected content 256 of host device 254. In certain embodiments, the password management application 216 can be configured to communicate with host device 228 and access plaintext login data 240 or encrypted login data 240. In certain embodiments, the password management application 216 can be configured to communicate with host device 244 and access protected content 256 after password authentication.

Consistent with various embodiments, the password management application 216 can include a login dialog 218. The login dialog can be associated with an internet web browser, software application, or other program module. The login dialog can be configured to prompt a user for a username and password entry in response to a request for accessing password protected content, such as protected content 256 of host device 244. For example, the login dialog 218 may be initiated by an internet webpage that allows users to log into a personal account.

In certain embodiments, the password management application 216 can include a password controller 220. The password controller 220 may facilitate storage and management of username and password data. Consistent with various embodiments of the present disclosure, the password controller 220 can be configured to receive a first password entry from a user. The password controller 220 can compare the received first password entry with a set of stored passwords. The set of stored passwords may, for instance, be stored within the plaintext login data 240 of host device 228. If the first password is not located within the list of stored passwords, the password controller 220 can generate a first hash value corresponding to the first password. Additionally, the password controller 220 can compare the first hash value to a set of hash values. The set of hash values may, for instance, be stored within the encrypted login data 242 of host device 228. In response to determining that the first hash value is not located in the encrypted login data 242, the password controller 220 can store the first hash value in the set of hash values.

Figure 3:
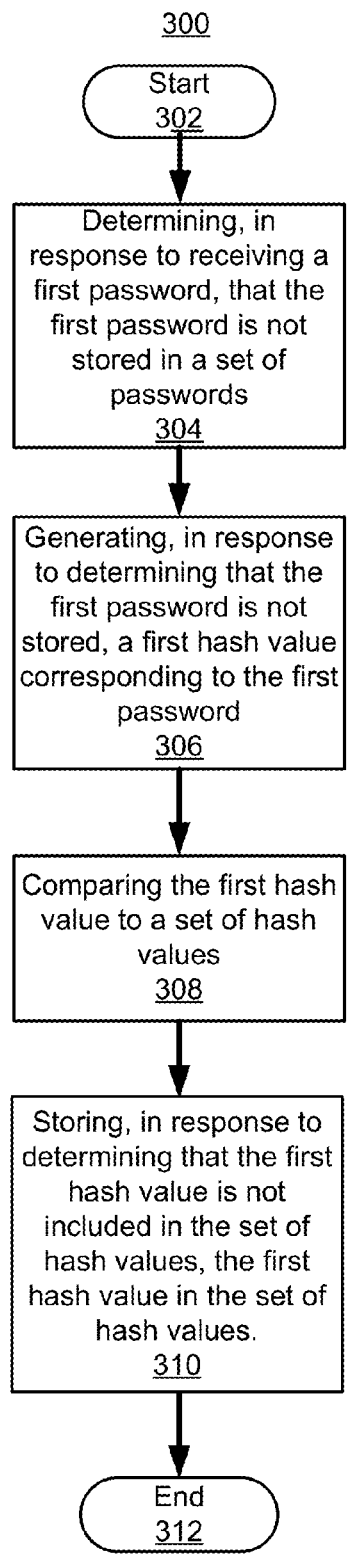
FIG. 3 is a flowchart illustrating a method for managing a password, according to embodiments.

FIG. 3 is a flowchart illustrating a method 300 for managing a password, consistent with embodiments of the present disclosure. Aspects of FIG. 3 are directed toward storing a hash value corresponding to a first password. The method 300 may begin at block 302 and end at block 312. Consistent with various embodiments, the method can include a determining block 304, a generating block 306, a comparing block 308, and a storing block 312.

Aspects of the present disclosure relate to the recognition that, in certain embodiments, it may not be desirable to store a password for later use. For example, multiple users may work in a shared environment, where remembering a password could have negative impacts on security. Accordingly, aspects of the present disclosure relate to a method and system that facilitates storing of a password based on the password itself. Aspects of the present disclosure are directed toward storing a hash value corresponding to a first password (e.g., a particular password that should not be remembered), and recognizing subsequent entries of the first password so as to avoid undesirable storage of the first password. Consistent with various embodiments, in response to receiving a first password from a user (e.g., via a login dialog menu), the method 300 can include presenting the user with a dialog menu including options regarding the decision to store the first password. Consistent with various embodiments, the dialog menu may include an option such as "Never store for this password." The following discussion relates to a method facilitating storing of a first hash value corresponding to a first password for which storage is undesirable.

Consistent with various embodiments, at block 304 the method 300 can include determining, in response to receiving a first password, that the first password is not stored in a set of passwords. The first password may be received in a password login dialog menu, such as that of a web page, computer boot sequence, operating system login sequence, or other program module associated with password protected content or a password protected domain. The first password may be input by a user. As shown in FIG. 3, the method 300 can include determining that the first password is not stored in a set of saved passwords. The set of saved passwords may include one or more passwords that have been designated for storage and later use (e.g., for logging into a computer, password protected domain, account, service, etc.). In certain embodiments, the set of passwords may be stored locally. For example, the set of passwords could be stored within the configuration of an internet browser, or on a storage medium. In certain embodiments, the set of passwords may be stored remotely. For example, the set of passwords may be stored on a host device (such as host device 228 of FIG. 2) accessible over a network (such as network 202 of FIG. 2) by the device on which method 300 is implemented.

In certain embodiments, determining that the first password is not stored in the set of passwords can include comparing the first password to the set of passwords. More particularly, comparing the first password to the set of passwords can include aligning the first password with each password of the set of passwords, and verifying that the first password does not match a password of the set of passwords.

Consistent with various embodiments, at block 306 the method 300 can include generating, in response to determining that the first password is not stored, a first hash value corresponding to the first password. In certain embodiments, the first hash value corresponding to the first password can be generated using a secure hash algorithm. The secure hash algorithm can be configured to map the first password to a fixed-length bit string. In certain embodiments, the first password cannot be recovered from the bit string. Put differently, the first hash value cannot be converted back to the first password. As an example, an eight character alphanumeric password (e.g., passw0rd) could be converted into a sixteen digit numerical hash value (e.g., 1234 5678 1234 5678). While the original password cannot be retrieved from the corresponding hash value, subsequent entries of the same password (e.g., passw0rd) into the same secure hash algorithm would yield the same sixteen digit hash value (1234 5678 1234 5678). As an example, in certain embodiments, the secure hash algorithm could be selected from a list of cryptographic hash functions. For instance, in certain embodiments, the secure hash algorithm could be the SHA-3 algorithm. Other types of cryptographic hash functions, algorithms, or methods of encrypting the first password are also possible.

Consistent with various embodiments, at block 308 the method 300 can include comparing the first hash value to a set of hash values. The set of hash values may include one or more hash values that each correspond to a password for which storage may be undesirable. In certain embodiments, the set of hash values may be stored locally. For example, the set of hash values could be stored within the configuration of an internet browser, or on a storage medium. In certain embodiments, the set of hash values may be stored remotely. For example, the set of hash values may be stored on a host device (such as host device 228 of FIG. 2) accessible over a network (such as network 202 of FIG. 2) by the device on which method 300 is implemented.

In certain embodiments, determining that the first hash value is not stored in the set of hash values can include comparing the first password to the set of hash values. More particularly, comparing the first hash value to the set of hash values can include aligning the first hash value with each hash value of the set of hash values, and verifying that the first hash value does not match a hash value of the set of hash values.

Consistent with various embodiments, at block 310 the method 300 can include storing the first hash value. In certain embodiments, storing the first hash value can be performed in response to determining that the first hash value is not included in the set of hash values. Further, in certain embodiments, storing the first hash value can include adding the first hash value to the set of hash values. As described herein, the set of hash values may be stored locally (e.g., in the configuration of a web browser or on a storage medium) or remotely (e.g., in the encrypted login data 242 of host device 228 of FIG. 2).

Aspects of the present disclosure relate to the recognition that, in certain situations, after storing the first hash value in the set of hash values, the method 300 may receive subsequent entry of the first password. For example, a user may log into a password protected domain or submit a request for access to password protected content after having indicated that the first password is not to be stored (e.g., the method 300 has stored a first hash value corresponding to the first password). Accordingly, aspects of the present disclosure are directed toward recognizing that a hash value corresponding to the first password has already been stored, and suppressing the option to store the first password.

Consistent with various embodiments, the method 300 can further include comparing a second hash value to the set of hash values. In certain embodiments, the second hash value may correspond to a password entered by a user. In certain embodiments, comparing the second hash value to the set of hash values can be performed in response to storing the first hash value in the set of hash values. In certain embodiments, the second hash value may be the same as the first hash value. Comparing the second hash value to the set of hash values can include aligning the second hash value with each hash value of the set of hash values, respectively, and determining whether the second hash value matches another hash value in the set of hash values. Further, in response to determining that the second hash value corresponds (e.g., matches) with a hash value included in the set of hash values, the method 300 can include suppressing a dialog menu for storing the first password in a set of passwords.

For instance, a user may use a password of "qwerty" to log into an email account, and the user may have indicated (on a previous login session) that the password of "qwerty" should not be stored. Accordingly, a hash value (such as 1928 3847 5647 3829) could be generated for the password of "qwerty," and stored in the set of hash values. When the user subsequently wishes to log into the email account and enters the password of "qwerty," the method 300 can generate a hash value for the password (such as 1928 3847 5647 3829). The method 300 can then compare this hash value to the set of hash values. In response to finding the hash value 1928 3847 5647 3829 already stored in the set of hash values, the method 300 can suppress the dialog menu for offering storage of the first password in the set of passwords.

Aspects of the present disclosure relate to the recognition that, in certain embodiments, it may be desirable to store a password that had been previously designated as undesirable for storage. Accordingly, aspects of the present disclosure are directed toward a system and method for deleting a particular hash value from the set of hash values, and thereby allowing storage of a password corresponding to that particular hash value. Consistent with various embodiments, the method 300 can include receiving a password delete request. The password delete request may, for example, be received from a user, and initiated via a setting within the configuration of a web browser or other program module. The method 300 can include generating, in response to receiving a first password, a first hash value corresponding to the first password. As an example, in certain embodiments, the method 300 can include providing the user with a dialog menu prompting them to enter the password they wish to delete. Generating the first hash value corresponding to the first password can, in certain embodiments, include using a secure hash algorithm. In certain embodiments, the secure hash algorithm can be the same hash algorithm as that used at block 306 of method 300 to generate the first hash value. Further, the method 300 can include deleting from the set of hash values a second hash value corresponding to the first hash value. For example, the second hash value may match (e.g., be identical) to the first hash value. In certain embodiments, deleting the second hash value can include removing the second hash value from the set of hash values.

For instance, a password that a user has previously designated as undesirable for storage (such as a password of "qwerty") may become acceptable for storage. In such a situation, a user could submit a request (e.g., via a dialog menu) to make the password allowable for storage. The request could prompt the user to enter the password he or she wishes to make allowable for storage. The user can enter the password of "qwerty," into the dialog menu, and the method 300 can generate a hash value (such as 1928 3847 5647 3829) for the password. The method 300 can then compare the hash value of 1928 3847 5647 3829 to a set of hash values, and delete a hash value matching 1928 3847 5647 3829. Accordingly, the password of "qwerty" could thereafter be stored in a set of passwords.

As a practical example of method 300, in certain embodiments, a user may enter a first password to log into a first account of an email service. The user may have several email accounts hosted by the email service, and different passwords for each account. The first password may be undesirable to store for later use, while the passwords for the other email accounts may be acceptable to store for later use. Accordingly, consistent with aspects of the present disclosure, the method 300 can include providing the user with a dialog menu in which he or she can indicate his or her wish to not store the first password. For the case in which the user decides not to store the first password, the method 300 can include determining that the first password is not stored in a set of passwords. The set of passwords may, for instance, include passwords that the user has stored. In response to determining that the first password is not stored in the set of passwords, the method 300 can include generating a first hash value corresponding to the first password. The method 300 can then compare the first hash value to a set of stored hash values. Each hash value of the set of stored hash values may, for example, correspond to a password for which storage is undesirable. In response to determining that the first hash value is not included in the set of hash values, the method 300 can include storing the first hash value in the set of hash values.

Consistent with various embodiments, when the user logs into the first account on subsequent occasions, the method 300 can recognize that a first hash value corresponding to the first password has already been stored in the set of hash values, and suppress the dialog menu offering storage for the first password. Additionally, in the event that the user wishes to delete the first hash value (thereby making the first password available for storage), the method 300 can include providing the user a dialog menu (e.g., accessible via the settings menu of a web browser or other program) in which the user can enter the first password. The method 300 can then generate a first hash value corresponding to the first password, and delete a second hash value identical to the first hash value from the set of stored hash values.

Figure 4:
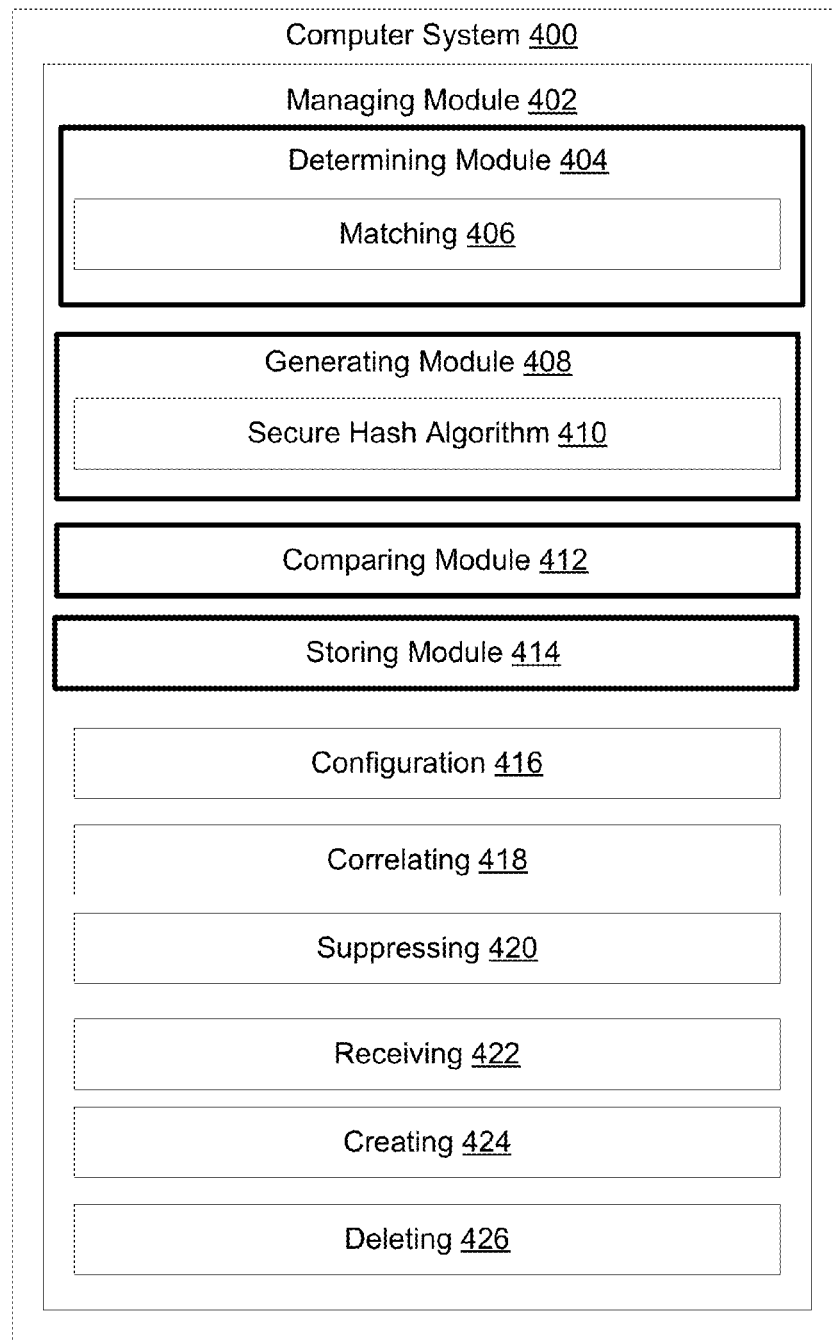
FIG. 4 illustrates modules of a system for managing a password, according to embodiments.

FIG. 4 illustrates modules of a system for managing a password, consistent with embodiments of the present disclosure. Consistent with various embodiments, method 300 can be implemented using one or more modules of FIG. 4. These modules can be implemented on hardware, software, or firmware executable on hardware, or a combination thereof. For example, these modules may be implemented on an exemplary computer system 400.

The computer system 400 can include a managing module 402. The managing module 402 can be configured to manage a password. The managing module 402 can include a determining module 404, a matching module 406, a generating module 408, a secure hash algorithm module 410, a comparing module 412, a storing module 414, a configuration module 416, a correlating module 418, a suppressing module 420, a receiving module 422, a creating module 424, and a deleting module 426.

The determining module 404 can be configured to determine, in response to receiving a first password, that the first password is not stored in a set of passwords. The first password may, for example, be entered by a user into a dialog menu. The first password may be an arbitrary-length character string. Determining that the first password is not stored in the set of passwords can include using a matching module 406 configured to compare the first password to the set of passwords. The set of passwords may be stored, for example, in the configuration of an internet browser. The configuration module 416 can be configured to manage the set of passwords.

The generating module 408 can be configured to generate, in response to determining that the first password is not stored, a first hash value corresponding to the first password. The first hash value may be generated by a secure hash algorithm module 410 configured to map a data input to a non-invertible data output. The data input may be an arbitrary-length string of characters, and the data output may be a fixed-length numeric string.

The comparing module 412 can be configured to compare the first hash value to a set of hash values. The set of hash values may be associated with the configuration of an internet browser. The configuration module 416 can be configured to manage the set of hash values. In certain embodiments, each hash value of the set of hash values may correspond with a password. The storing module 414 can be configured to store the first hash value in the set of hash values. Storing the first hash value in the set of hash values can be performed in response to determining that the first hash value is not included in the set of hash values.

The correlating module 418 can be configured to compare, in response to storing the first hash value in the set of hash values, a second hash value to the set of hash values. Further, the suppressing module 420 can be configured to suppress, in response to determining that the second hash value corresponds with a hash value included in the set of hash values, a dialog menu for storing the first password in a set of passwords. Additional aspects of the present disclosure are directed toward receiving a password delete request. The receiving module 422 can be configured to receive the password delete request. In response to receiving the password delete request, the creating module 424 can be configured to generate a first hash value corresponding to the first password. Further, the deleting module 426 can be configured to delete, from a set of hash values, a second hash value corresponding to the first hash value.

Figure 5:
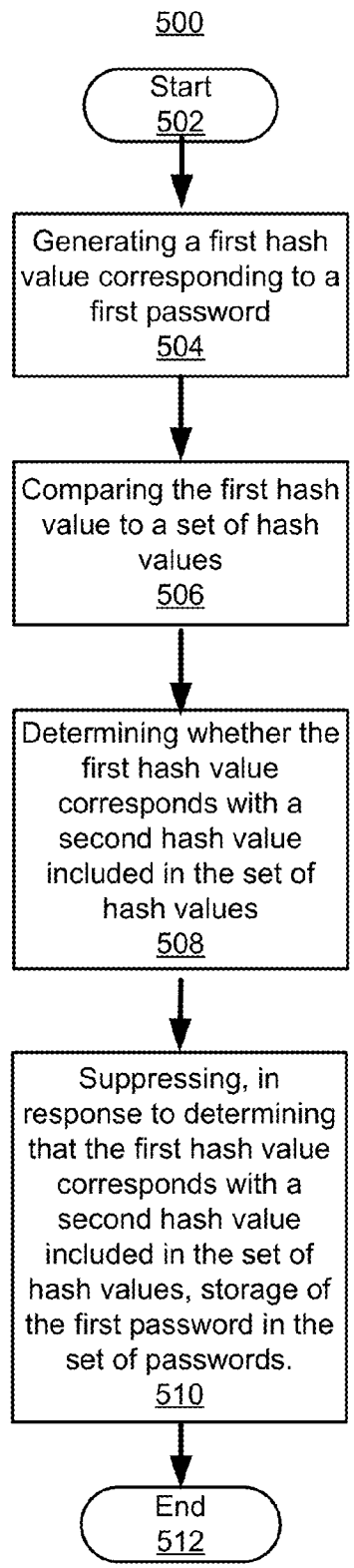
FIG. 5 is a flowchart illustrating a method for managing a password.

FIG. 5 is a flowchart illustrating a method 500 for managing a password, consistent with embodiments of the present disclosure. Aspects of FIG. 5 are directed toward suppressing storage of a first password in the set of passwords. The method 500 may begin at block 502 and end at block 512. Consistent with various embodiments, the method can include a generating block 504, a comparing block 506, a determining block 508, and a suppressing block 510.

Consistent with various embodiments, at block 504 the method 500 can include generating a first hash value corresponding to a first password. In certain embodiments, the first hash value corresponding to the first password can be generated using a secure hash algorithm. The secure hash algorithm can be configured to map the first password to a fixed-length bit string. In certain embodiments, the first password cannot be recovered from the bit string. Put differently, the first hash value cannot be converted back to the first password. As an example, an eight character alphanumeric password (e.g., passw0rd) could be converted into a sixteen digit numerical hash value (e.g., 1234 5678 1234 5678). While the original password cannot be retrieved from the corresponding hash value, subsequent entries of the same password (e.g., passw0rd) into the same secure hash algorithm would yield the same sixteen digit hash value (1234 5678 1234 5678). As an example, in certain embodiments, the secure hash algorithm could be selected from a list of cryptographic hash functions. For instance, in certain embodiments, the secure hash algorithm could be the SHA-3 algorithm. Other types of cryptographic hash functions, algorithms, or methods of encrypting the first password are also possible.

Consistent with various embodiments, at block 506 the method 500 can include comparing the first hash value to a set of hash values. The set of hash values may include one or more hash values that each correspond to a password for which storage may be undesirable. In certain embodiments, the set of hash values may be stored locally. For example, the set of hash values could be stored within the configuration of an internet browser, or on a storage medium. In certain embodiments, the set of hash values may be stored remotely. For example, the set of hash values may be stored on a host device (such as host device 228 of FIG. 2) accessible over a network (such as network 202 of FIG. 2) by the device on which method 500 is implemented.

Consistent with various embodiments, at block 508 the method 500 can include determining whether the first hash value corresponds with a second hash value included in the set of hash values. As described herein, in certain embodiments, determining whether the first hash value corresponds with a second hash value can include aligning the first hash value with each hash value of the set of hash values, and ascertaining whether the first hash value matches a hash value of the set of hash values.

Consistent with various embodiments, at block 510 the method 500 can include suppressing storage of the first password in the set of passwords. In certain embodiments, suppressing storage of the first password in the set of passwords can be performed in response to determining that the first hash value corresponds with a second hash value included in the set of hash values. For instance, a user may use a password of "qwerty" to log into an email account, and the user may have indicated (on a previous login session) that the password of "qwerty" should not be stored. Accordingly, a hash value (such as 1928 3847 5647 3829) could be generated for the password of "qwerty," and stored in the set of hash values. When the user subsequently wishes to log into the email account and enters the password of "qwerty," the method 300 can generate a hash value for the password (such as 1928 3847 5647 3829). The method 300 can then compare this hash value to the set of hash values. In response to finding the hash value 1928 3847 5647 3829 already stored in the set of hash values, the method 300 can suppress the dialog menu for offering storage of the first password in the set of passwords.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for managing a password, the method comprising:
   receiving a first password via a login dialog menu;
   comparing, with a processor, the first password to a set of passwords used by a password manager to enter passwords into respective login dialog menus, the set of passwords being stored in a memory communicatively coupled to the processor;
   in response to determining that the first password is not stored in the set of passwords, generating, with the processor, a first hash value corresponding to the first password;
   comparing, with the processor, the first hash value to a set of hash values stored in the memory communicatively coupled to the processor, wherein the hash values in the set of hash values correspond to respective passwords that are not stored in the set of passwords;
   determining, with the processor, whether the first hash value corresponds with a second hash value included in the set of hash values; and
   suppressing, with the processor and in response to determining that the first hash value corresponds with a second hash value included in the set of hash values, storage of the first password in the set of passwords used by the password manager to enter passwords into respective login dialog menus.

2. The method of claim 1, further comprising adding a third hash value to the set of hash values.

3. The method of claim 2, wherein adding the third hash value is performed programmatically or by a user.

4. The method of claim 1, further comprising:
receiving a password delete request;
generating, in response to receiving a first password, a first hash value corresponding to the first password; and
deleting, from a set of hash values, a second hash value corresponding to the first hash value.

5. The method of claim 1, wherein the first hash value is generated by a secure hash algorithm configured to map a data input to a non-invertible data output.

6. The method of claim 1, wherein the set of hash values is associated with the configuration of an internet browser.

7. The method of claim 1, further comprising storing, in response to determining that the first hash value is not included in the set of hash values, the first hash value in the set of hash values.

8. A computer implemented method for managing a password, the method comprising:
receiving user input indicating that a first password is not to be stored in a set of passwords accessible by a password manager;
generating, with a processor and in response to receiving the user input that the first password is not to be stored, a first hash value corresponding to the first password, wherein the first password cannot be retrieved from the first hash value;
comparing, with the processor, the first hash value to a set of hash values stored in a memory communicatively coupled with the processor, wherein the hash values in the set of hash values correspond to respective passwords not to be stored in the set of passwords;
storing, in response to determining that the first hash value is not included in the set of hash values, the first hash value in the set of hash values;
receiving a second password via a login dialog menu;
comparing, with the processor, the second password to the set of passwords;
in response to determining that the second password is not stored in the set of passwords, generating, with the processor, a second hash value corresponding to the second password;
comparing, with the processor, the second hash value to the set of hash values; and
in response to determining that the second hash value corresponds to the first hash value, suppressing, with the processor, a dialog menu offering storage of the second password in the set of passwords.

9. The method of claim 8, wherein the first hash value is generated by a secure hash algorithm configured to map a data input to a non-invertible data output.

10. The method of claim 8, wherein the set of passwords and the set of hash values are associated with the configuration of an internet browser.

11. The method of claim 8, further comprising:
receiving a password delete request;
generating, in response to receiving a first password, a first hash value corresponding to the first password; and
deleting, from a set of hash values, a second hash value corresponding to the first hash value.

\* \* \* \* \*